US008880546B1

(12) United States Patent
Trauth (10) Patent No.: US 8,880,546 B1
(45) Date of Patent: Nov. 4, 2014

(54) SYSTEM, METHOD, AND COMPUTER PROGRAM FOR REFINING A SET OF KEYWORDS UTILIZING HISTORICAL ACTIVITY THRESHOLDS

(75) Inventor: Kurt Trauth, San Antonio, TX (US)

(73) Assignee: Amdocs Software Systems Limited, Dublin (IE)

( * ) Notice: Subject to any disclaimer, the term of this patent is extended or adjusted under 35 U.S.C. 154(b) by 397 days.

(21) Appl. No.: 13/168,818

(22) Filed: Jun. 24, 2011

Related U.S. Application Data (60) Provisional application No. 61/453,091, filed on Mar. 15, 2011.

(51) Int. Cl.
*G06F 17/30* (2006.01)

(52) U.S. Cl.
USPC ........................................................ 707/765

(58) Field of Classification Search
USPC .......... 707/765, 766, 768, 769, 758, 731, 723
See application file for complete search history.

(56) References Cited

U.S. PATENT DOCUMENTS

| | | | | |
|---|---|---|---|---|
| 6,006,225 | A * | 12/1999 | Bowman et al. ....................... 1/1 |
| 6,169,986 | B1 * | 1/2001 | Bowman et al. ....................... 1/1 |
| 6,772,150 | B1 * | 8/2004 | Whitman et al. ............. 707/721 |
| 8,185,544 | B2 * | 5/2012 | Oztekin et al. ............... 707/768 |
| 8,321,437 | B2 * | 11/2012 | Lim .............................. 707/758 |
| 8,386,509 | B1 * | 2/2013 | Scofield et al. ............... 707/769 |
| 8,566,165 | B1 * | 10/2013 | Zhang et al. ............... 705/14.66 |
| 2004/0236736 | A1 * | 11/2004 | Whitman et al. .................. 707/3 |
| 2006/0224583 | A1 * | 10/2006 | Fikes et al. ......................... 707/6 |
| 2006/0282328 | A1 * | 12/2006 | Gerace et al. ................... 705/14 |
| 2007/0011224 | A1 | 1/2007 | Mena |
| 2007/0239671 | A1 * | 10/2007 | Whitman et al. .................. 707/2 |
| 2007/0288431 | A1 * | 12/2007 | Reitter et al. ..................... 707/3 |
| 2007/0288433 | A1 * | 12/2007 | Gupta et al. ...................... 707/3 |
| 2007/0288514 | A1 * | 12/2007 | Reitter et al. .............. 707/104.1 |
| 2008/0168099 | A1 * | 7/2008 | Skaf ........................... 707/104.1 |
| 2008/0221987 | A1 * | 9/2008 | Sundaresan et al. ........... 705/14 |
| 2008/0319353 | A1 * | 12/2008 | Howell et al. ................. 600/595 |
| 2009/0222759 | A1 | 9/2009 | Drieschner |
| 2009/0307003 | A1 * | 12/2009 | Benyamin et al. ................ 705/1 |
| 2010/0017398 | A1 * | 1/2010 | Gupta et al. ...................... 707/5 |
| 2010/0082652 | A1 * | 4/2010 | Jones et al. .................... 707/758 |
| 2010/0262615 | A1 * | 10/2010 | Oztekin et al. ............... 707/768 |
| 2010/0312764 | A1 * | 12/2010 | Liao et al. ..................... 707/723 |
| 2011/0015996 | A1 * | 1/2011 | Kassoway et al. ......... 705/14.49 |
| 2011/0029408 | A1 * | 2/2011 | Shusterman et al. ........ 705/27.1 |
| 2011/0055195 | A1 * | 3/2011 | Reitter et al. ................. 707/710 |
| 2011/0161331 | A1 * | 6/2011 | Chung et al. ................. 707/751 |

* cited by examiner

*Primary Examiner* — Jean M Corrielus
(74) *Attorney, Agent, or Firm* — Zilka-Kotab, PC (57) ABSTRACT

A system, method, and computer program product are provided for refining a set of keywords utilizing historical activity thresholds. In use, a set of keywords is identified. Additionally, historical activity related to the set of keywords is determined. Further, the historical activity is compared to at least one predefined threshold. Moreover, an action associated with refining the set of keywords is automatically performed, based on the comparison.

19 Claims, 5 Drawing Sheets

SYSTEM, METHOD, AND COMPUTER PROGRAM FOR REFINING A SET OF KEYWORDS UTILIZING HISTORICAL ACTIVITY THRESHOLDS

RELATED APPLICATION(S)

The present application claims the priority of a previously filed provisional application filed Mar. 15, 2011 under Ser. No. 61/453,091, which is incorporated herein by reference in its entirety.

FIELD OF THE INVENTION

The present invention relates to user behaviors in a computing environment, and more particularly to analysis of such user behaviors.

BACKGROUND

Traditionally, analytics solutions have been provided for analyzing user behavior in a computing environment, such as online, etc. For example, the analytics solutions may analyze computing activity of the user. The analysis is then typically utilized for identifying trends in user behavior. Unfortunately, techniques for leveraging the identifiable trends in user behavior have been limited, particularly with respect to projecting user behavior which is not necessarily a specific subject of the identified user behavior trends (e.g. but which may related to the user behavior that is a basis for the identified trend, etc.).

There is thus a need for addressing these and/or other issues associated with the prior art.

SUMMARY

A system, method, and computer program product are provided for refining a set of keywords utilizing historical activity thresholds. In use, a set of keywords is identified. Additionally, historical activity related to the set of keywords is determined. Further, the historical activity is compared to at least one predefined threshold. Moreover, an action associated with refining the set of keywords is automatically performed, based on the comparison.

DETAILED DESCRIPTION

Figure 1:
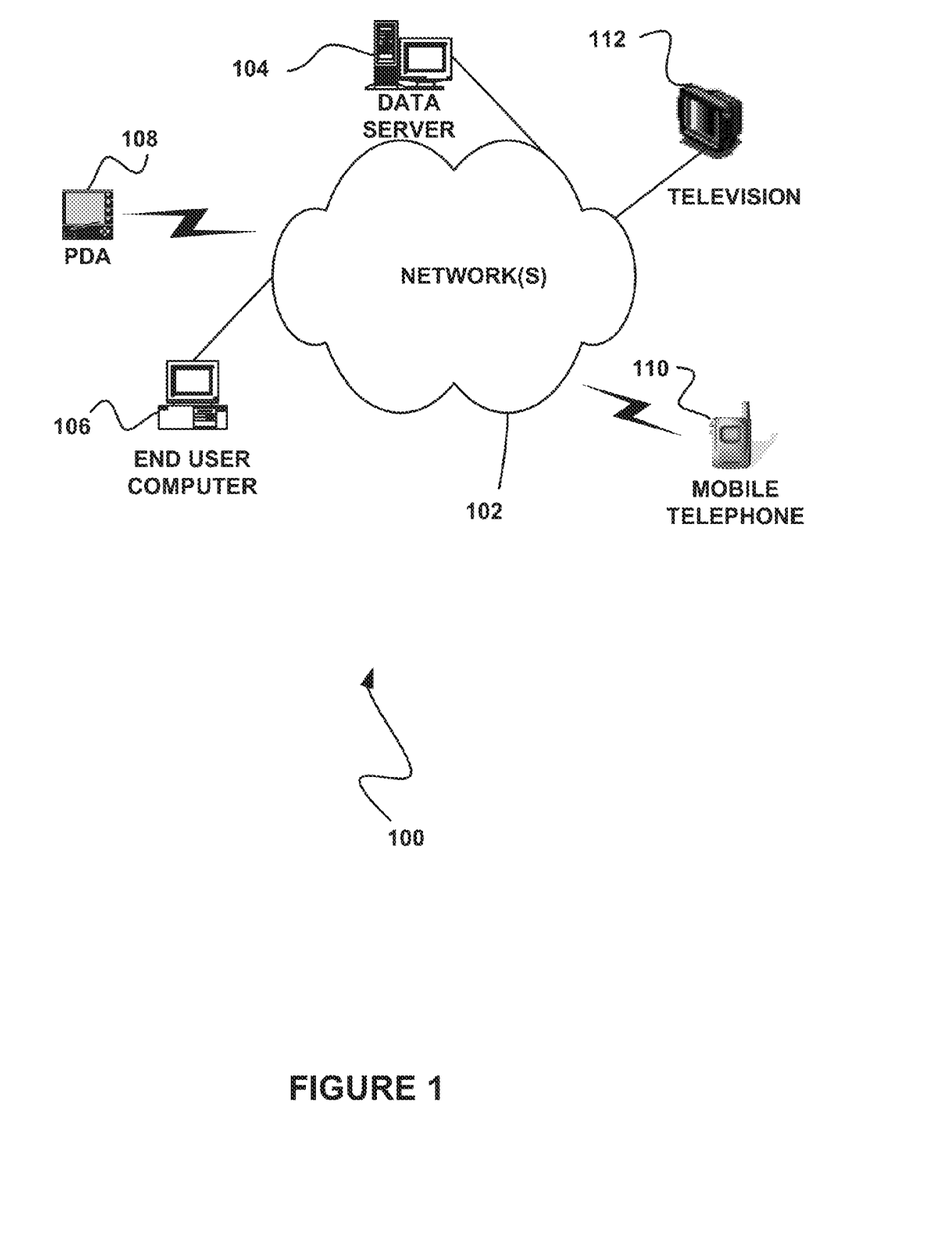
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
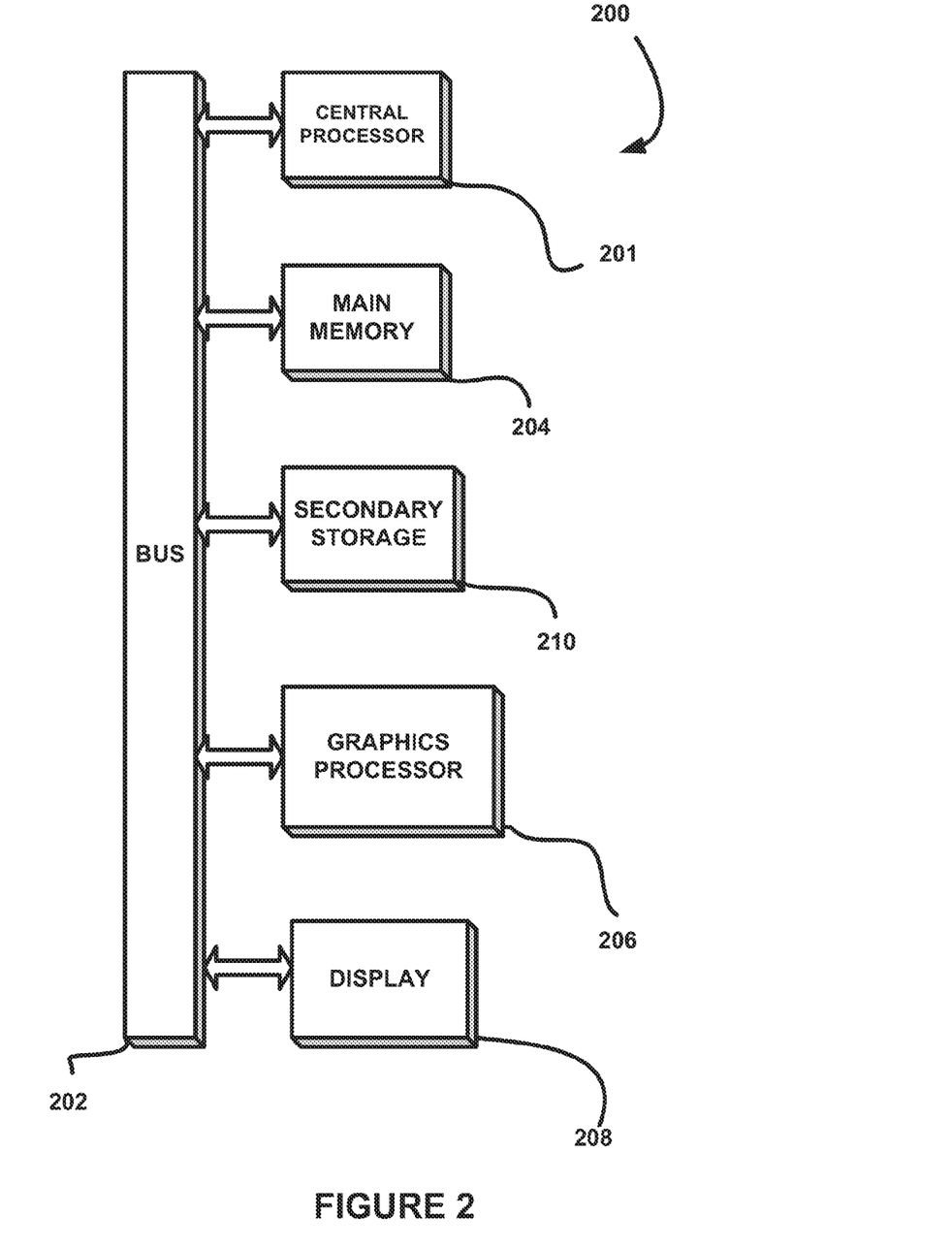
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
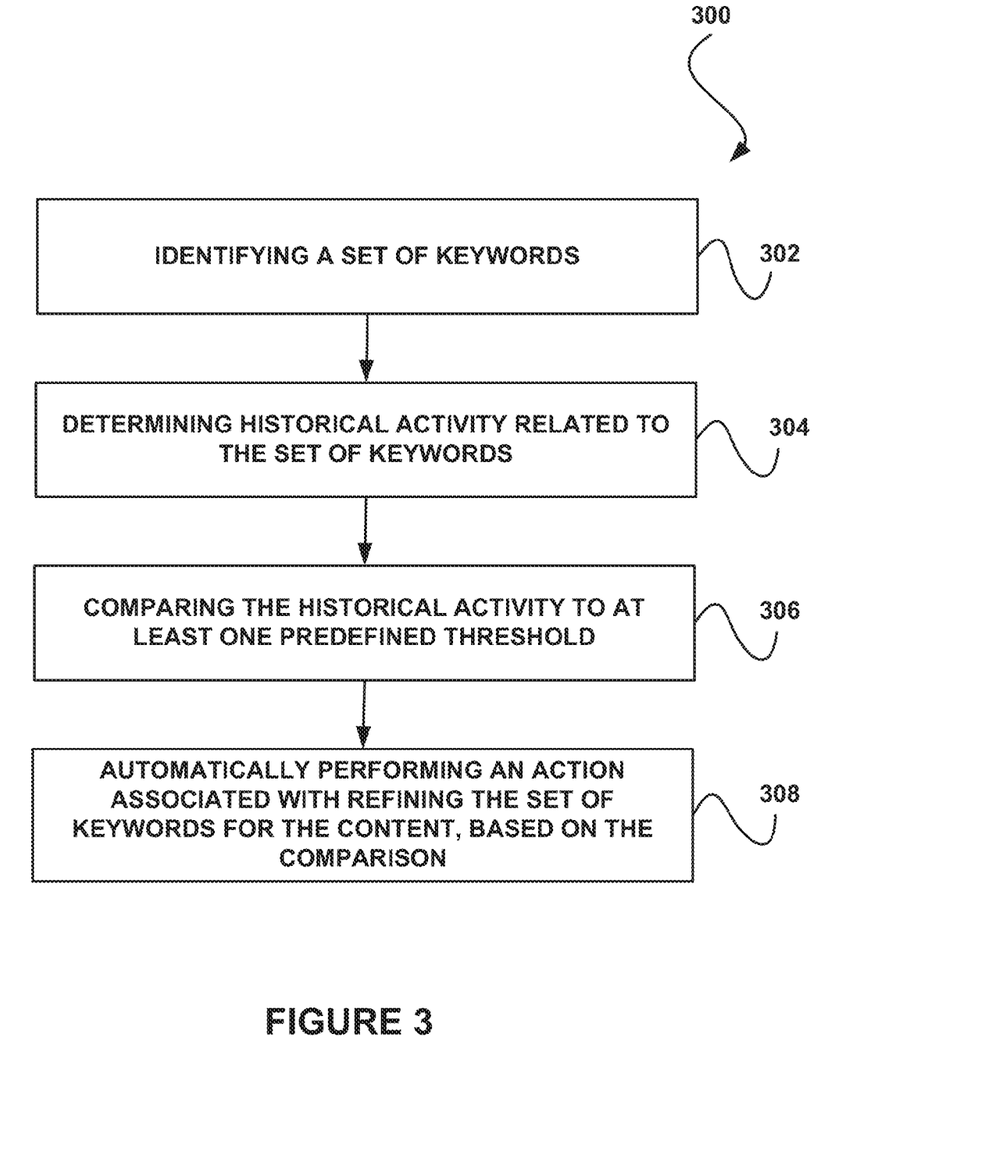
FIG. 3 illustrates a method for refining a set of keywords utilizing historical activity thresholds, in accordance with one embodiment.

FIG. 3 illustrates a method 300 for refining a set of keywords utilizing historical activity thresholds, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a set of keywords is identified. In the context of the present description, the set of keywords may include one or more words. It should be noted that each word may be a sequence of one or more characters, symbols, values, etc.

In one embodiment, the set of keywords may include one or more words that are representative of content. For example, the content may include a document, text, webpage, application, or any other data capable of being represented (e.g. characterized, categorized, described, etc.) by one or more words. In another embodiment, the set of keywords may include one or more words that are representative of a service provided by a service provider (e.g. which may be subscribed to or otherwise utilized by a customer or user). For example, the service may include a telephone service, an Internet service, or any other service capable of being represented (e.g. characterized, categorized, described, etc.) by one or more words. In yet another embodiment, the set of keywords may include one or more words that are representative of a topic (e.g. category) associated with the content/service.

As an option, the set of keywords may be predetermined by a user for representing the content/service. For example, the user may predetermine the set of keywords based on the user determining that the set of keywords are believed to best represent the content/service or a topic associated with (i.e. a category of) the content/service. As another example, the user may predetermine the set of keywords based on the user determining that the set of keywords is the one most likely to be used by another user when searching for the topic associated with the content/service (e.g. when requesting a search engine to find the content/service) or when creating content or providing a service having the associated topic (e.g. by including the keywords in the content or in data associated with the service, such as a manual for the service).

To this end, the set of keywords may be identified in response to the user selecting the set of keywords for the content/service, assigning the set of keywords to the content/service, creating the content including the set of keywords, or otherwise requesting the association of the set of keywords with the content/service. Of course, however, the set of keywords may be identified in any desired manner (e.g. and not necessarily based on a predetermination by a user for the particular content/service). For example, in one embodiment, the set of keywords may include a plurality of words included in a search query, such that the set of keywords may be identified in response to the search query being performed. As another example, the set of keywords may be identified automatically (e.g. from a database storing the set of keywords in association with the content, etc.) based on a schedule.

Additionally, as shown in operation 304, historical activity related to the set of keywords is determined. In the context of the present description, the historical activity may include any data indicative of activity (e.g. actions, etc.) already performed in association with the set of keywords, such as within a predetermined period of time (e.g. a predetermined amount of time prior to the current time). Such activity may include user activity, automated activity (e.g. by an application), etc.

In one embodiment, the historical activity related to the set of keywords may include a volume of online activity associated with the set of keywords (e.g. that a content/service provider has experienced related to the set of keywords). For example, the historical activity may include search requests each including the set of keywords (or a predetermined portion thereof) made to a search engine. As another example, the historical activity may include comments each including the set of keywords (or a predetermined portion thereof) posted to a social media website. As yet another example, the historical activity may include content published online which includes the set of keywords (or a predetermined portion thereof). To this end, the historical activity may be determined from at least one provider of an internet-based service (e.g. a provider of a search engine, a provider of a social media website or other website, etc.).

Further, as shown in operation 306, the historical activity is compared to at least one predefined threshold. The predefined threshold may include any value that is predetermined with respect to the set of keywords (e.g. by the user who determined the set of keywords, etc.). For example, a single threshold may be predefined for the set of the keywords. With respect to such example, the historical activity where each activity involved all keywords in the set of keywords may be compared to the single predefined threshold.

As another example, a separate threshold may be predefined for each keyword in the set of keywords. With respect to such example, the threshold predefined for a particular one of the keywords in the set of keywords may only be compared to the portion of the historical activity involving that particular one of the keywords. Of course, however, the predefined threshold(s) may be predefined for any portion of the set of keywords.

As an option, the historical activity may be directly compared to the predefined threshold(s), such as via the examples described above. As another option, the historical activity may be analyzed (e.g. evaluated) and a result of the analysis compared to the predefined threshold(s). For example, the analysis may involve applying a predetermined algorithm to the historical activity (e.g. summing a number of occurrences of the activity included in the historical activity, etc.), and an output from the algorithm may be compared to the predefined threshold(s).

As a further option, at least one trend may be determined from the historical activity. The trend may be determined by mapping, plotting, etc., the historical activity (e.g. over time). With respect to such option, the comparison may include comparing the trend to the predefined threshold(s).

Moreover, as shown in operation 308, an action associated with refining the set of keywords is automatically performed, based on the comparison. The automatic performance of the action, which is based on the comparison, may thus avoid a user initiating the action. It should be noted that the automatic performance of the action may be based on the comparison of the historical activity to the predefined threshold(s) in any desired manner.

For example, a rule may dictate whether the action is to be automatically performed for a particular result of the comparison. In one embodiment, the action may be automatically performed in response to a determination that a result of the comparison of the historical activity to the predefined threshold(s) meets the rule, and the action may be prevented from being automatically performed in response to a determination that the result of the comparison of the historical activity to the predefined threshold(s) does not meet the rule.

Just by way of example, the rule may dictate that if the comparison indicates that the historical activity meets the predefined threshold(s), then the action is to be automatically performed. As another example, the rule may dictate that if the comparison indicates that the historical activity does not meet the predefined threshold(s), then the action is not to be automatically performed. Thus, the action may only conditionally be automatically performed, based on the comparison of the historical activity to the predefined threshold(s).

As another option, the particular action taken may depend on the application of the rule to the result of the comparison. For example, the rule may dictate that for one result of the comparison a first action is performed, but for another result of the comparison a second action is performed. In this way, different actions may be performed based on an outcome of the comparison of the historical activity to the predefined threshold(s).

It should be noted that the action may include any operation, method, command, etc. associated with refining the set of keywords which is automated (i.e. does not require human intervention for performance of the action to be initiated and/or completed). In various embodiments, the action may include issuing a notification to a user recommending the refining of the set of keywords, automatically refining the set of keywords, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
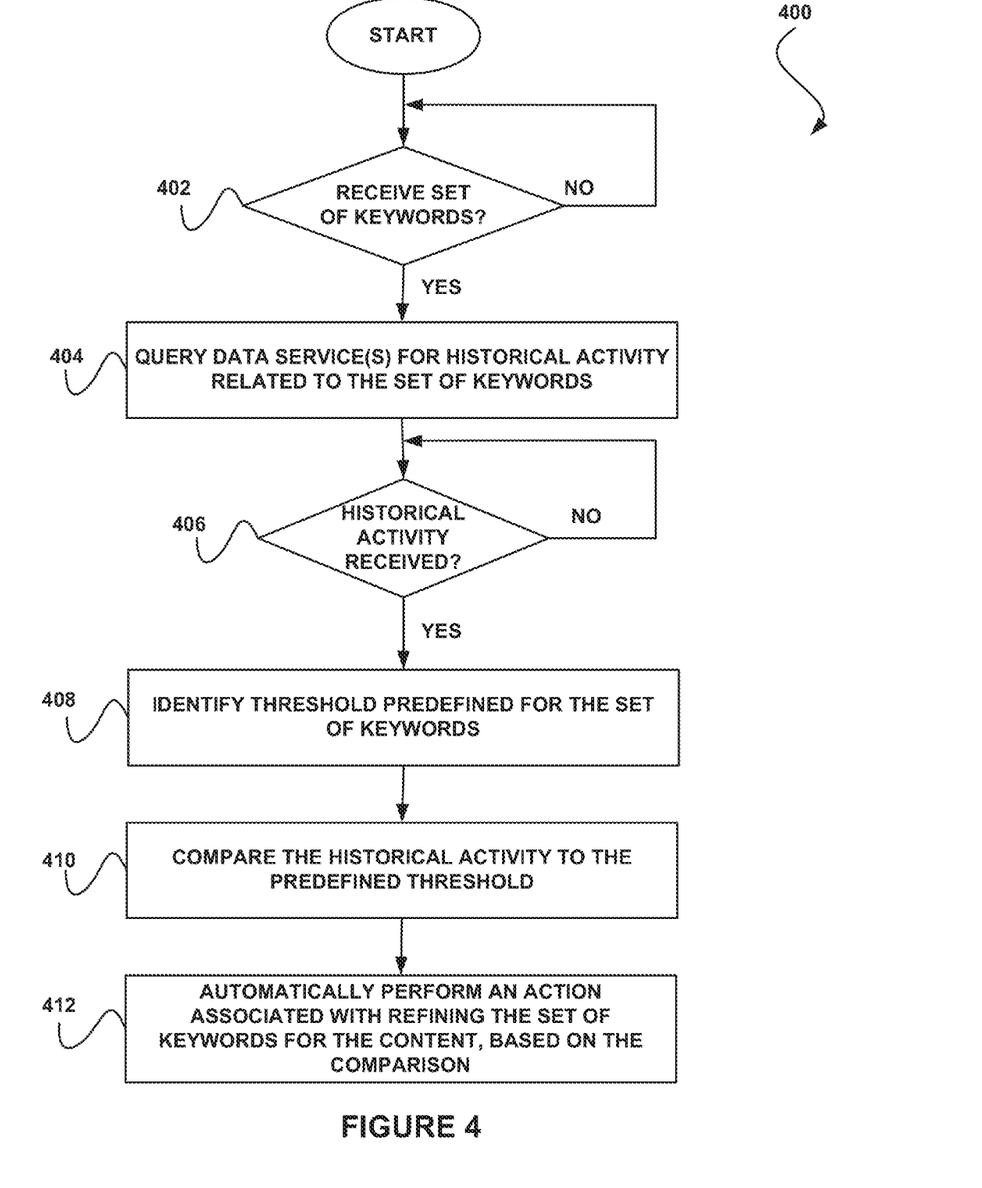
FIG. 4 illustrates a method for automatically refining a set of keywords for content utilizing historical activity thresholds, in accordance with another embodiment.

FIG. 4 illustrates a method 400 for automatically refining a set of keywords for content utilizing historical activity thresholds, in accordance with another embodiment. As an option, the method 400 may be carried out the context of the details of FIGS. 1-3. Of course, however, the method 400 may be carried out in any desired environment. Again, the aforementioned definitions may equally apply to the description below.

As shown in decision 402, it is determined whether a set of keywords for content is received. In one embodiment, the set of keywords may be received in response to a user associating the set of keywords with a particular piece of content or a particular topic (e.g. based on a determination that the set of keywords best represent the content). In another embodiment, the set of keywords may be received in response to a periodic retrieval of keyword sets stored for content. For example, the method 400 may execute at regular intervals based on the rates at which historical activity can be accessed from data services.

If it is determined that a set of keywords is not received, the method 400 continues to wait for a set of keywords to be received. Once it is determined that a set of keywords for content is received, at least one data service is queried for historical activity related to the set of keywords. Note operation 404. The data service may include any service capable of supplying data indicative of historical activity related to the set of keywords.

In one embodiment, the data service may include a search engine capable of providing historical activity on related searches that have been performed using the keywords in the set of keywords. In another embodiment, the data service may include public websites capable of providing historical activity on content created by individuals or formal organizations such as news websites.

To this end, a data set of a data service may be queried for historical activity related to the set of keywords. As an option, the query may be for a volume of historical activity the data service has experienced in relation to the set of keywords, such as a number of actions having the set of keywords. For example, for search engines this may be the number of search requests made that included the set of keywords, and for a social media site may be the number of unique comments that users have posted that included the set of keywords.

It is then determined whether the historical activity is received, as shown in decision 406. In particular, it may be determined whether the data requested by the query has been received [e.g. by the data service(s)]. If it is determined that the historical activity has not been received, the method 400 continues to wait for receipt of the historical activity. As an option, if historical information is received from at least one of the data services that were queried, then the method 400 may optionally only wait for historical information from any remaining data services that were queried for a predetermined amount of time before proceeding with operation 408.

When it is determined that the historical activity (or a portion thereof as described above) has been received, a threshold predefined for the set of keywords is identified. Note operation 408. While only a single threshold is described, it should be noted that multiple thresholds may be predefined for the set of keywords, and thus identified in operation 408.

The historical activity is then compared to the predefined threshold, as shown in operation 410. Where specific historical activity has been received, the historical activity may optionally be processed prior to being compared to the predefined threshold. For example, a volume of the historical activity may be determined and compared to the predefined threshold. As another example, a trend may be determined from the historical activity and compared to the predefined threshold.

Furthermore, as shown in operation 412, an action associated with refining the set of keywords is automatically performed, based on the comparison. For example, if the comparison indicates that the historical activity meets the threshold, then the action may be automatically performed. Of course, the action may be automatically performed if the historical activity falls below the threshold, or based on any other result of the comparison (e.g. as dictated by a rule).

In one embodiment, the action may include automatically refining the set of keywords. One example of automatically refining the set of keywords is described in detail below with respect to FIG. 5. In another embodiment, the action may include providing a notification associated with refining the set of keywords. For example, an alert may be triggered which can be integrated with a variety of existing systems (e.g. alerts may trigger communications such as an automated email or short message service (SMS), or provide data to another system which implements other actions based on a defined set of rules). The notification may enable an entity receiving the notification to take immediate action associated with refining the set of keywords.

To this end, historical activity may be received and compared to a predefined threshold for identifying changes (e.g. increases in activity within a specified timeframe) that may indicate a significant change in user behavior with respect to the set of keywords. By providing an automated manner of acting with respect to a refinement of the set of keywords, it may be ensured the current set of keywords accurately represents the current activity of users.

As a further option, any trend identified from the historical activity may be used to project a potential impact of the emerging user activity on an entity (e.g. an entity identifying the trend). In one embodiment, the historical activity received from the data services may be external to the entity and may be analyzed in view of historical activity received from data sources internal to the entity. The historical activity received from data sources internal to the entity may include, by way of example, volumes of customer support requests, page views on the entity's website, and changes to customer accounts (such as removing the service from their account).

For example, the trend identified form the historical activity received from the external data services may be analyzed in view of a trend identified from the historical activity received from data sources internal to the entity. This analysis may develop correlations between the historical activity trends determined from the external data services and internal system data trends determined from the data sources internal to the entity, to develop a mathematical model for projecting an impact on the entity's operations for the future. For example, the trend identified from the historical activity received from data sources internal to the entity may be identified from the analysis as a trend resulting from, or otherwise directly correlated with, the trend identified form the historical activity received from the external data services.

Thus, in the future if the trend identified form the historical activity received from the external data services is identified, at least in part, then it may be projected that the trend identified from the historical activity received from data sources internal to the entity can be expected to occur. The correlation can also be used to identify how actions that the entity took in response to the trend identified form the historical activity received from the external data services resulted in changes to user activity external to the entity. Thus, the analysis can identify which actions are most effective in changing user activity, which can enable the entity to be more effective in its actions when future trends are identified.

In one exemplary embodiment, particular online user activity (i.e. external to an entity), such as search engine requests, may be correlated with call volumes across a variety of support issue events which are internal to an entity. This correlation may allow the entity to identify these emerging issues within the first hours/days of customers beginning to experience it by first identifying the particular online user activity.

Figure 5:
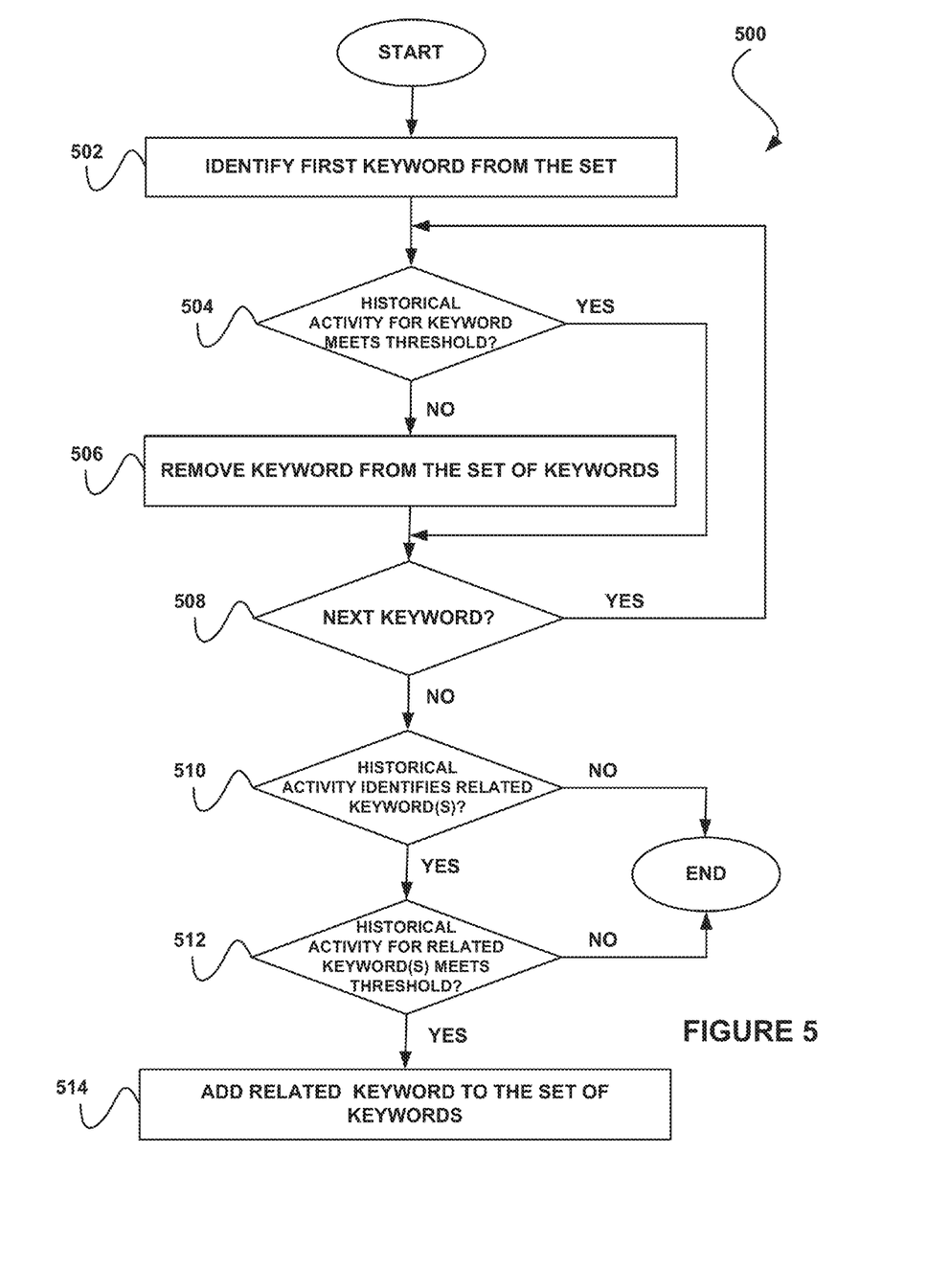
FIG. 5 illustrates a method for refining a set of keywords utilizing historical activity thresholds by adding and removing keywords from the set, in accordance with yet another embodiment.

FIG. 5 illustrates a method 500 for refining a set of keywords utilizing historical activity thresholds by adding and removing keywords from the set, in accordance with yet another embodiment. As an option, the method 500 may be carried out in the context of the details of FIGS. 1-4. For example, the method 500 may be carried out with reference to operations 408-412 of FIG. 4. Of course, however, the method 500 may be carried out in any desired environment. Further, the aforementioned definitions may equally apply to the description below.

As shown in operation 502, a first keyword from a set of keywords is identified. It is then determined in decision 504 whether historical activity for the keyword meets a threshold. If it is determined that the historical activity for the keyword meets the threshold, it is determined whether another keyword exists in the set of keywords. Note operation 508. Thus, the keyword may be maintained in the set of keywords, and a next keyword may be analyzed with respect to its associated threshold (as indicated again in operation 504).

If it is determined that the historical activity for the keyword does not meet the threshold, the keyword is removed from the set. Note operation 506. In this way, any keyword related to historical activity that does not meet an associated threshold may be removed from the set of keywords. This may result in disassociation of the keyword from a topic/content for which the set of keywords is determined. The analysis of a next keyword is then performed (as shown in decision 508 returning to decision 504 and operation 506).

Furthermore, it is determined whether historical activity determined for the set of keywords identifies any related keywords. Note decision 510. In one embodiment, the related keywords may include those included in the historical activity. Just by way of example, the related keywords may include those included in search queries also having the set of keywords, etc.

If it is determined that the historical activity determined for the set of keywords does not identify any related keywords, the method 500 ends. On the other hand, if it is determined that the historical activity determined for the set of keywords identifies one or more related keywords, it is determined in decision 512 whether the historical activity for each related keyword meets a predefined threshold. Such predefined threshold may optionally be specific to the identified related keywords which are not yet included in the set of keywords.

For each identified related keyword, if it is determined that historical activity for the related keyword does not meet the predefined threshold, then that related keyword is not added to the set of keywords. Further, the method 500 ends. If it is determined for any of the related keywords that historical activity for the related keyword meets the predefined threshold, the related keyword is added to the set of keywords. Note operation 514. In this way, the set of keywords may optionally be automatically refined, including the addition and removal of keywords from the set of keywords, based on predefined thresholds applied to the historical activity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable storage medium containing instructions that when executed by a processor cause a computer to:
identify a set of keywords, the set including a plurality of keywords;
determine historical activity data indicative of activity previously performed with respect to the set of keywords, including determining for each keyword of the plurality of keywords a portion of the historical activity data involving the keyword;
compare the historical activity data to a plurality of predefined thresholds, including for each keyword of the plurality of keywords, comparing at least a threshold predefined for the keyword to the portion of the historical activity data involving the keyword; and
automatically perform an action for refining the set of keywords, including removing a keyword from the set of keywords, when a result of the comparison indicates that the portion of the historical activity data involving the keyword does not meet the threshold predefined for the keyword.

2. The computer program of claim 1, wherein the identified set of keywords includes a plurality of words representative of content.

3. The computer program of claim 2, wherein the computer program is operable such that the plurality of words is predetermined by a user for representing the content.

4. The computer program of claim 1, wherein the set of keywords includes a plurality of words included in a search query.

5. The computer program of claim 1, wherein the computer program is operable such that the set of keywords are identified in response to a user request.

6. The computer program of claim 1, wherein the computer program is operable such that the set of keywords are identified automatically based on a schedule.

7. The computer program of claim 1, wherein the historical activity data indicative of the activity previously performed with respect to the set of keywords includes a volume of online activity associated with the set of keywords.

8. The computer program of claim 1, wherein the historical activity data includes search requests each including the set of keywords made to a search engine.

9. The computer program of claim 1, wherein the historical activity data includes comments each including the set of keywords posted to a social media website.

10. The computer program of claim 1, wherein the computer program is operable such that the historical activity data is determined from at least one provider of an internet-based service.

11. The computer program of claim 10, wherein the at least one provider of the internet-based service includes a provider of a search engine.

12. The computer program of claim 10, wherein the at least one provider of the internet-based service includes a provider of a social media website.

13. The computer program of claim 1, further comprising computer code for determining at least one trend from the historical activity data.

14. The computer program of claim 13, wherein the computer program is operable such that the comparison includes comparing the at least one trend to one or more of the plurality of predefined thresholds.

15. The computer program of claim 1, wherein the historical activity data includes data indicative of activity previously performed with respect to the set of keywords within a predetermined period of time prior to a current time.

16. The computer program of claim 1, wherein the set of keywords is identified in response to a user selecting the set of keywords to be associated with at least one of a content and a service.

17. A method, comprising:
   identifying a set of keywords, the set including a plurality of keywords;
   determining historical activity data indicative of activity previously performed with respect to the set of keywords, including determining for each keyword of the plurality of keywords a portion of the historical activity data involving the keyword;
   comparing the historical activity data to a plurality of predefined thresholds, including for each keyword of the plurality of keywords, comparing a threshold predefined for the keyword to the portion of the historical activity data involving the keyword; and
   automatically performing an action for refining the set of keywords, including removing a keyword from the set of keywords, when a result of the comparison indicates that the portion of the historical activity data involving the keyword does not meet the threshold predefined for the keyword.

18. A system, comprising:
   a hardware processor for:
      identifying a set of keywords, the set including a plurality of keywords;
      determining historical activity data indicative of activity previously performed with respect to the set of keywords, including determining for each keyword of the plurality of keywords a portion of the historical activity data involving the keyword;
      comparing the historical activity data to a plurality of predefined thresholds, including for each keyword of the plurality of keywords, comparing a threshold predefined for the keyword to the portion of the historical activity data involving the keyword; and
      automatically performing an action for refining the set of keywords, including removing a keyword from the set of keywords, when a result of the comparison indicates that the portion of the historical activity data involving the keyword does not meet the threshold predefined for the keyword.

19. The system of claim 18, wherein the processor is coupled to memory via a bus.

\* \* \* \* \*